Aug. 14, 1928.

W. B. McCALL 1,680,899

POWER TRANSMISSION DEVICE

Filed Aug. 9, 1927  2 Sheets-Sheet 1

Inventor
William B. McCall
By Murray E. Guyette
Attorneys

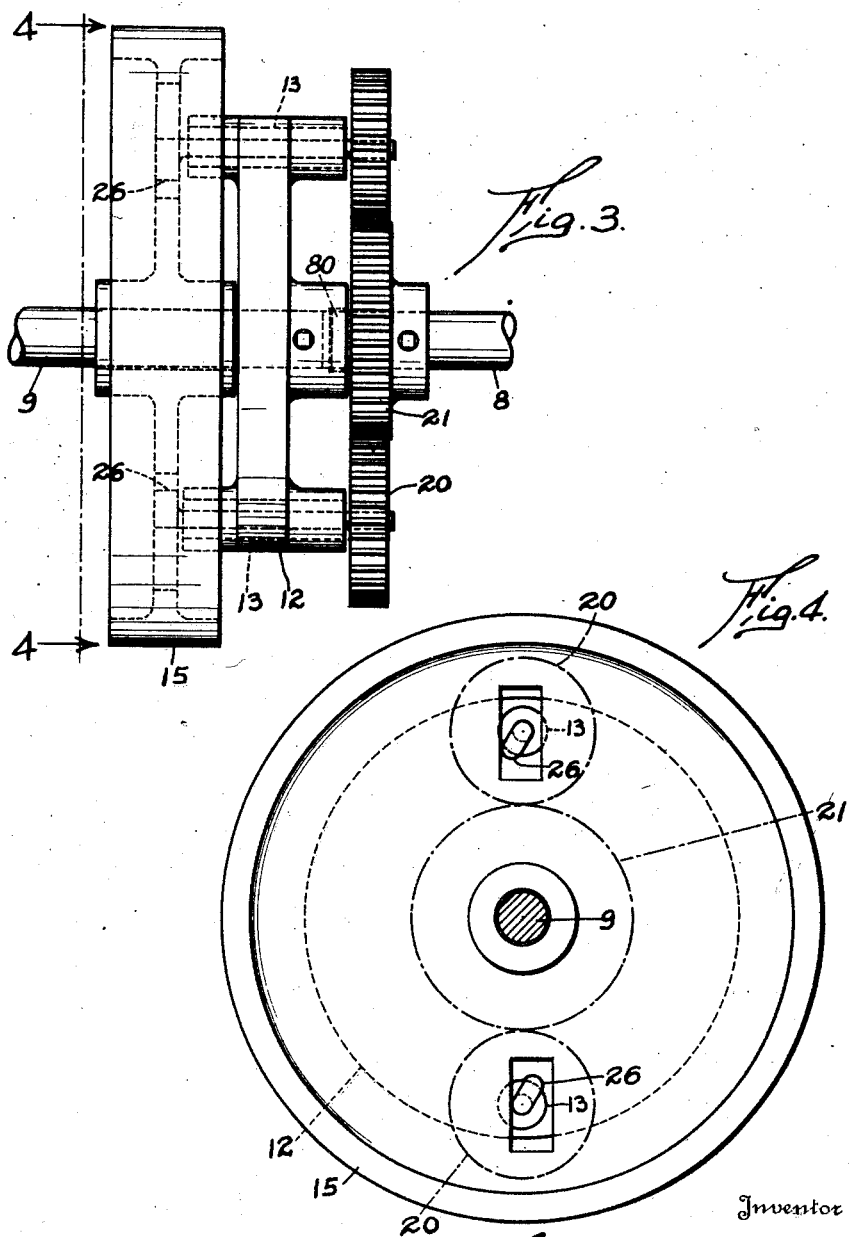

Patented Aug. 14, 1928.

1,680,899

UNITED STATES PATENT OFFICE.

WILLIAM B. McCALL, OF CINCINNATI, OHIO.

POWER-TRANSMISSION DEVICE.

Application filed August 9, 1927. Serial No. 211,824.

This invention relates to a power transmission device in which the speed of a driven shaft is automatically reduced proportionally as the load thereon is increased, even though the speed of its drive shaft remains constant.

An object is to thereby preclude straining and overloading of an engine drive shaft.

Another object is to eliminate the necessity of manually operated gear ratio changes.

Another object is to maintain an engine speed which is economical and at which speed the engine develops a maximum of power.

Another object of this invention is to provide a device for the purposes stated which will be simple and efficient, and which may be cheaply manufactured.

These and other objects are attained by the means described herein and disclosed in the accompanying drawings in which:

Fig. 3 is a side elevational view of a modified form of the device.

Fig. 4 is a cross sectional view on line 4—4 of Fig. 3.

For purposes of explanation, the device of this invention will be described and explained as applied to a self-propelled vehicle such as an automobile, although it may obviously be used on boats, machinery, and the like or wherever speed changes are desirable. The device automatically controls the speed of rotation of a driven shaft 8, relative to the speed of a drive shaft 9 from which the shaft 8 receives its rotatory motion. As the load, or resistance to rotation, is applied to driven shaft 8, the device of this invention decreases the speed of the driven shaft 8 thereby allowing drive shaft 9 to continue at a given rate of speed without stalling the motor or engine 10.

Figure 1:
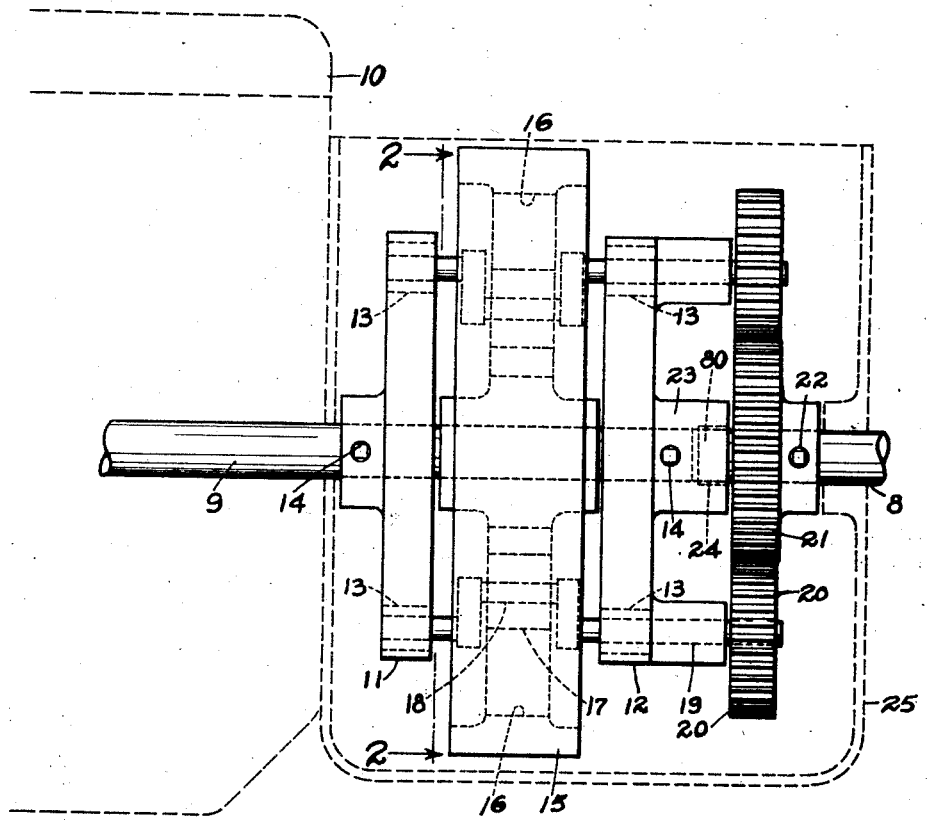
Fig. 1 is a side elevational view of the device.

Referring to Fig. 1 of the drawings the drive shaft 9 carries upon it a pair of plates or discs 11 and 12 each of which is provided with bearings 13, preferably of the ball or roller type commonly used for anti-friction purposes. The plates may be secured to the shaft by any suitable means such as set screws 14. The drive shaft 9 also carries, between the plates 11 and 12, a freely rotatable flywheel 15 adapted for oscillation upon the shaft 9 by a means to be described later. The oscillatable member or flywheel 15 is provided with radial slots or perforations 16 each adapted to receive a reciprocable sliding bearing block 17 in which is journaled an eccentric shaft or crank 18 of a crankshaft 19.

In the following description, an explanation of the function of one of the crankshafts 19 will suffice, as the device will operate satisfactorily with one crankshaft. The crankshaft 19 is journaled in aligned bearings 13 of plates 11 and 12 as shown in Fig. 1. On one end of the crankshaft is fixedly secured a pinion gear 20 which meshes with a gear 21 on driven shaft 8. Gears 20 and 21 may be secured to their respective shafts by any suitable means such as a set screw 22. The hub 23 of plate 12 may be adapted, as shown in Fig. 1, to form a bearing 24 for the end 80 of shaft 8 for the purpose of maintaining the axial alignment thereof with shaft 9. This arrangement also serves to properly mesh the gears 20 and 21. It is desirable also to encase the entire device in a housing 25 for the purpose of providing a lubricant reservoir in which the parts may run and thereby eliminate undue wear.

Referring now to the modified form shown in Figs. 3 and 4, it will be noted that the plate 11 has been eliminated and that the cranks 19 have been replaced by cams 26 which perform the same function as the cranks 19. An advantage of this construction over the crank construction is that there is less reciprocatory motion in the cams, than in the cranks and co-operative sliding blocks 17. In order to more fully set forth the various parts and their co-operative relationship with one another, a detailed explanation of the operation of the device will follow.

Figure 2:
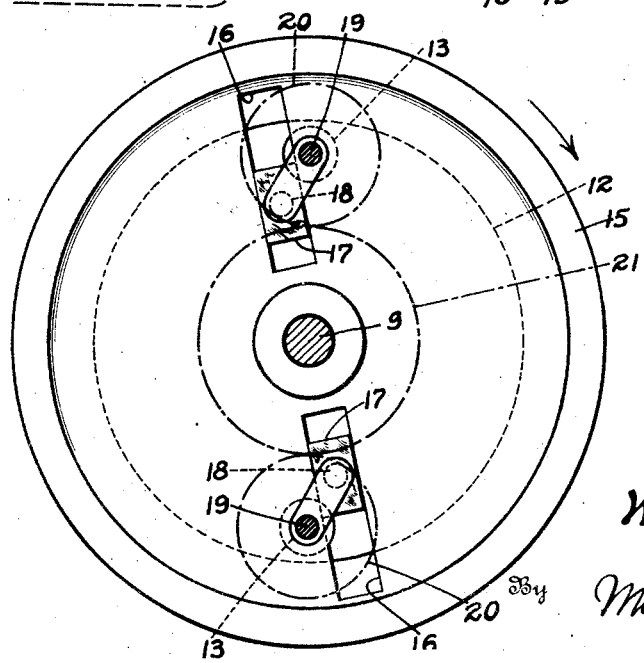
Fig. 2 is a cross sectional view on line 2—2 of Fig. 1.

We will assume that shaft 8 is free and that shaft 9 of Figs. 1 and 2 is slowly rotated in a clockwise direction by the engine 10 whereupon the discs 11 and 12, being secured to said shaft, are rotated therewith. The crankshaft 19 being journaled in the discs and also in bearing blocks 17, will exert a pull on the bearing blocks thereby turning the flywheel or oscillatable member 15 with the discs and the shaft 9. It will be readily evident that if shaft 8 has no load thereon and may be freely rotated, the gears 20 and 21 will have no relative movement and crankshafts 19 will not rotate in the bearings 13. As long as shaft 8 is free, the cranks 18 will continue to urge the flywheel into rotation with the discs, and the bearing blocks 17 will have no reciprocating movement in the slots or ways 16. The gear ratio will then be 1:1.

The foregoing is an extreme case wherein there is no resistance to rotation of driven shaft 8. Now it will be assumed that shaft 8 has applied thereto a resistance sufficient to preclude rotatory movement, or is locked. Drive shaft 9 continues to rotate because of its connection with motor 10, and it continues to rotate at substantially the same speed notwithstanding the locked condition of shaft 8. The reason for this is that when shaft 8 is locked, gear 21, being secured thereto, is likewise locked. The shaft 19 is being constantly revolved about shaft 9 as an axis because of its connection with plates 11 and 12 and at the same time it is rotated in the bearings 13 because of the relative movement of gears 20 and 21. This rotation of the crankshaft causes actuation of crank or eccentric 18 which reciprocates the bearing blocks 17 effecting oscillation of the flywheel or oscillatable member 15. The above movement, as stated before, is effected by locking the shaft 8.

Assuming now that the shaft 8 is not locked but is acted upon by a force yieldingly resisting rotatory movement thereof, the device will be actuated in a manner such that shaft 8 will rotate and at the same time the flywheel will oscillate. The rotation of shaft 8 however will be reduced in speed, for whenever the oscillating movement of the flywheel is present, some of the speed of shaft 8 is being utilized. This may be made clearer by a statement that when the flywheel is oscillated to the limit, the entire rotatory movement of shaft 8 is utilized, and vice versa. This has been exemplified in the preceding explanation of operation. It should be understood that the flywheel 15 simultaneously rotates with the shaft 9 and oscillates thereon except in the case when shaft 8 is free to rotate. The flywheel then rotates with drive shaft 9 and does not oscillate for reasons previously stated.

It is to be noted that by varying the amount of throw of the cranks 18 or by varying the sizes of gears 20 and 21, the device may be made sensitive to great or small resistances, as desired. This may be accomplished in various ways such as by properly weighting the oscillatable member, or by disposing the crank shaft bearings 13 closer to or farther from the drive shaft 9. In like manner the device of modified form (Figs. 3 and 4) may be regulated.

In some cases, depending on the use for which the device of this invention is built, the oscillatable member need not be a flywheel, but may be a disc or the like similar to discs 11 and 12. It may also be desirable to in some cases utilize only one crank 17 or cam 26, whereas in others, a plurality may be more desirable. It is to be understood that various modifications may be made in the mechanical structure of the device without departing from the spirit and scope of the invention.

What is claimed is:

In a device of the class described, the combination with a drive shaft rotatable by means of a power source, a plate fixedly secured upon the drive shaft, a bearing in the plate, an oscillatable slotted member rotatably mounted upon the drive shaft adjacent the plate, a rotatable cam shaft provided with an eccentric and a pinion gear, said shaft being rotatably received in the bearing in the plate and said eccentric being received in the slot in the oscillatable member whereby rotation of said shaft and eccentric serves to oscillate the oscillatable member relative to the plate, a driven shaft in axial alignment with the drive shaft and adapted for independent rotation, a gear fixedly mounted upon the driven shaft and engaging the pinion gear on the cam shaft whereby relative movement of the drive shaft and driven shaft may actuate the gears, cam shaft, and eccentric for oscillating the oscillatable member for compensating for the difference in speed of rotation between the drive shaft and the driven shaft.

In testimony whereof, I have hereunto subscribed my name this 5th day of August, 1927.

WILLIAM B. McCALL.